United States Patent
Aleksandrov

(10) Patent No.: US 9,614,796 B2
(45) Date of Patent: Apr. 4, 2017

(54) REPLACING EMAIL FILE ATTACHMENT WITH DOWNLOAD LINK

(71) Applicant: Aleksandar Aleksandrov, Sofia (BG)

(72) Inventor: Aleksandar Aleksandrov, Sofia (BG)

(73) Assignee: SAP SE, Walldorf (DE)

( * ) Notice: Subject to any disclaimer, the term of this patent is extended or adjusted under 35 U.S.C. 154(b) by 123 days.

(21) Appl. No.: 14/208,063

(22) Filed: Mar. 13, 2014

(65) Prior Publication Data

US 2015/0264111 A1   Sep. 17, 2015

(51) Int. Cl.
| G06F 15/16 | (2006.01) |
| G06F 15/173 | (2006.01) |
| G06F 15/177 | (2006.01) |
| H04L 12/58 | (2006.01) |
| H04L 29/08 | (2006.01) |

(52) U.S. Cl.
CPC .......... H04L 51/08 (2013.01); H04L 67/2823 (2013.01)

(58) Field of Classification Search
CPC .......... H04L 67/08; H04L 67/10; H04L 51/08
USPC .............................. 726/4; 709/206; 713/168
See application file for complete search history.

(56) References Cited

U.S. PATENT DOCUMENTS

| 5,813,008 A | 9/1998 | Benson et al. |
| 8,667,074 B1* | 3/2014 | Farkas .................... H04L 51/12 709/206 |
| 2005/0182821 A1* | 8/2005 | Chan .................... G06F 21/6236 709/207 |
| 2006/0075028 A1* | 4/2006 | Zager .................... G06Q 10/107 709/206 |
| 2007/0016613 A1* | 1/2007 | Foresti ................. G06Q 10/107 707/706 |
| 2007/0271344 A1* | 11/2007 | Danasekaran ......... G06Q 10/10 709/206 |
| 2008/0281924 A1* | 11/2008 | Gadwale ................. H04L 12/58 709/206 |
| 2009/0063869 A1* | 3/2009 | Kohavi ............... G06F 21/6218 713/189 |
| 2009/0248823 A1* | 10/2009 | Li ....................... H04L 12/5855 709/206 |
| 2009/0327262 A1* | 12/2009 | Grack ............... G06F 17/30011 707/654 |
| 2010/0082713 A1* | 4/2010 | Frid-Nielsen ......... G06F 17/301 707/821 |

(Continued)

OTHER PUBLICATIONS

"Single Instance Storage," from technet.microsoft.com, published Jul. 10, 2009, accessed Mar. 5, 2014, 2 pages.

(Continued)

*Primary Examiner* — Haresh N Patel
(74) *Attorney, Agent, or Firm* — Klarquist Sparkman, LLP

(57) ABSTRACT

Solutions are provided for authorizing access to and/or sharing of email attachments. An example method may include, by a computing device, detecting an email message with a file attachment. The email message may identify one or more recipients of the file attachment. The file attachment may be stored in a database table. The database table may include at least one permissions entry controlling access by the one or more recipients to the stored file attachment. The file attachment may be replaced in the email message, with a download link to a location in the database table storing the file attachment. The email message may be delivered with the download link to the one or more recipients.

6 Claims, 9 Drawing Sheets

(56) References Cited

U.S. PATENT DOCUMENTS

| | | | | |
|---|---|---|---|---|
| 2010/0169295 | A1* | 7/2010 | Kanamori | G06F 17/30011 707/706 |
| 2011/0016091 | A1* | 1/2011 | Prahlad | G06F 11/1453 707/654 |
| 2011/0072264 | A1* | 3/2011 | McNulty | G06F 21/32 713/168 |
| 2011/0264745 | A1* | 10/2011 | Ferlitsch | G06Q 10/109 709/205 |
| 2012/0278404 | A1* | 11/2012 | Meisels | G06Q 10/107 709/206 |
| 2012/0303653 | A1* | 11/2012 | Arifin | G06F 15/16 707/769 |
| 2012/0317222 | A1* | 12/2012 | Almeida | G06Q 10/107 709/206 |
| 2013/0046986 | A1* | 2/2013 | Dancer | H04L 9/0825 713/171 |
| 2013/0080545 | A1* | 3/2013 | Datta | G06Q 10/107 709/206 |
| 2013/0144958 | A1* | 6/2013 | St. Jacques, Jr. | G06Q 10/107 709/206 |
| 2013/0242335 | A1* | 9/2013 | Naitoh | G06K 15/405 358/1.14 |
| 2013/0333042 | A1* | 12/2013 | Saika | G06F 11/1469 726/24 |
| 2014/0019558 | A1* | 1/2014 | Pollack | H04L 51/08 709/206 |
| 2014/0164535 | A1* | 6/2014 | Lynch | H04L 67/26 709/206 |
| 2014/0362165 | A1* | 12/2014 | Ackerman | H04L 65/4076 348/14.07 |
| 2015/0081649 | A1* | 3/2015 | Kim | G06F 17/30156 707/692 |

OTHER PUBLICATIONS

"Six enterprise cloud storage and file-sharing services to consider," from techtarget.com, published May 6, 2013, accessed Mar. 11, 2014, 3 pages.

"Dropbox (service)," from Wikipedia.org, last modified Mar. 4, 2014, visited Mar. 5, 2014, 10 pages.

* cited by examiner

REPLACING EMAIL FILE ATTACHMENT WITH DOWNLOAD LINK

BACKGROUND

Accessing and sharing of file attachments can be a resource and time consuming task. For example, users often receive email messages with large file attachments, which emails are then forwarded to other users with the attachment. Such communication of large email messages increases network traffic significantly. Additionally, the large email messages take up server storage resources, which burden is exponentially increased as the message/attachment is forwarded to multiple users. Furthermore, in some instances, accessing the email file attachments may require an authorization from one or more of the users. Designation of such authorizations as well as managing of established user authorizations may be difficult as there may be multiple users associated with a single email attachment.

Therefore, there exists ample opportunity for improvement in technologies related to authorizing access to file attachments and sharing of file attachments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

For example, a method can be provided for authorizing access to and/or sharing of email attachments, where the method may include detecting an email message with a file attachment. The email message may identify one or more recipients of the file attachment. The file attachment may be stored in a database table. The database table may include at least one permissions entry controlling (e.g., allowing or denying) access by the one or more recipients to the stored file attachment. The file attachment may be replaced in the email message, with a download link to a location in the database table storing the file attachment. The email message may be delivered with the download link to the one or more recipients.

As another example, a system can be provided, which may include a memory, a processing unit coupled to the memory, and one or more computer-readable storage media storing instructions causing the processing unit to perform operations for authorizing access to and/or sharing of email file attachments. The operations may include detecting an email message with at least one file attachment. The email message may identify a recipient of the at least one file attachment. A sender of the email message may be authenticated for accessing a database table. The database table may include at least a file content portion, a file names portion, a user list portion, and a permissions list portion. The at least one file attachment may be stored in the file content portion of the database table. A first permission may be stored in the permissions list portion. The first permission may provide the sender with unrestricted access privileges to the at least one file attachment stored in the database table. A second permission may be stored in the permissions list portion, where the second permission may provide the recipient with restricted access privileges to the at least one file attachment stored in the database table.

As another example, one or more computer-readable storage media may be provided, which may store computer-executable instructions for performing a method for authorizing access to and/or sharing of email file attachments. The method may include detecting an email message with a file attachment. The email message may identify aa recipient of the file attachment. The file attachment may be stored in a database table. At least one permissions entry may be stored in the database table, for the recipient and a sender of the email message. The at least one permissions entry may provide the recipient and the sender with access privileges (e.g., restricted access privileges or unrestricted access privileges) to the stored file attachment. The restricted access privileges may include read-only or download-only access privileges. A notification may be delivered to the recipient with a download link to a location in the database table storing the file attachment.

As another example, one or more computer-readable storage media may be provided, which may store therein a file sharing permissions data structure for authorizing access to and/or sharing email file attachments. The data structure may include a files table, a file names table, a users table, and a permissions table. The files table may be operable to store one or more file attachments detected in at least one email from at least one email sender authorized to access the data structure, the at least one email addressed to at least one recipient. The file names table may be operable to store a file name for the one or more file attachments. The users table may be operable to store a user email address and/or a user name for one or both of the at least one email sender and/or the at least one email recipient. The permissions table may be operable to store one or more permissions for the at least one email sender and/or the at least one email recipient for accessing the one or more file attachments listed in the file names table.

As described herein, a variety of other features and advantages can be incorporated into the technologies as desired.

DETAILED DESCRIPTION

Figure 1:
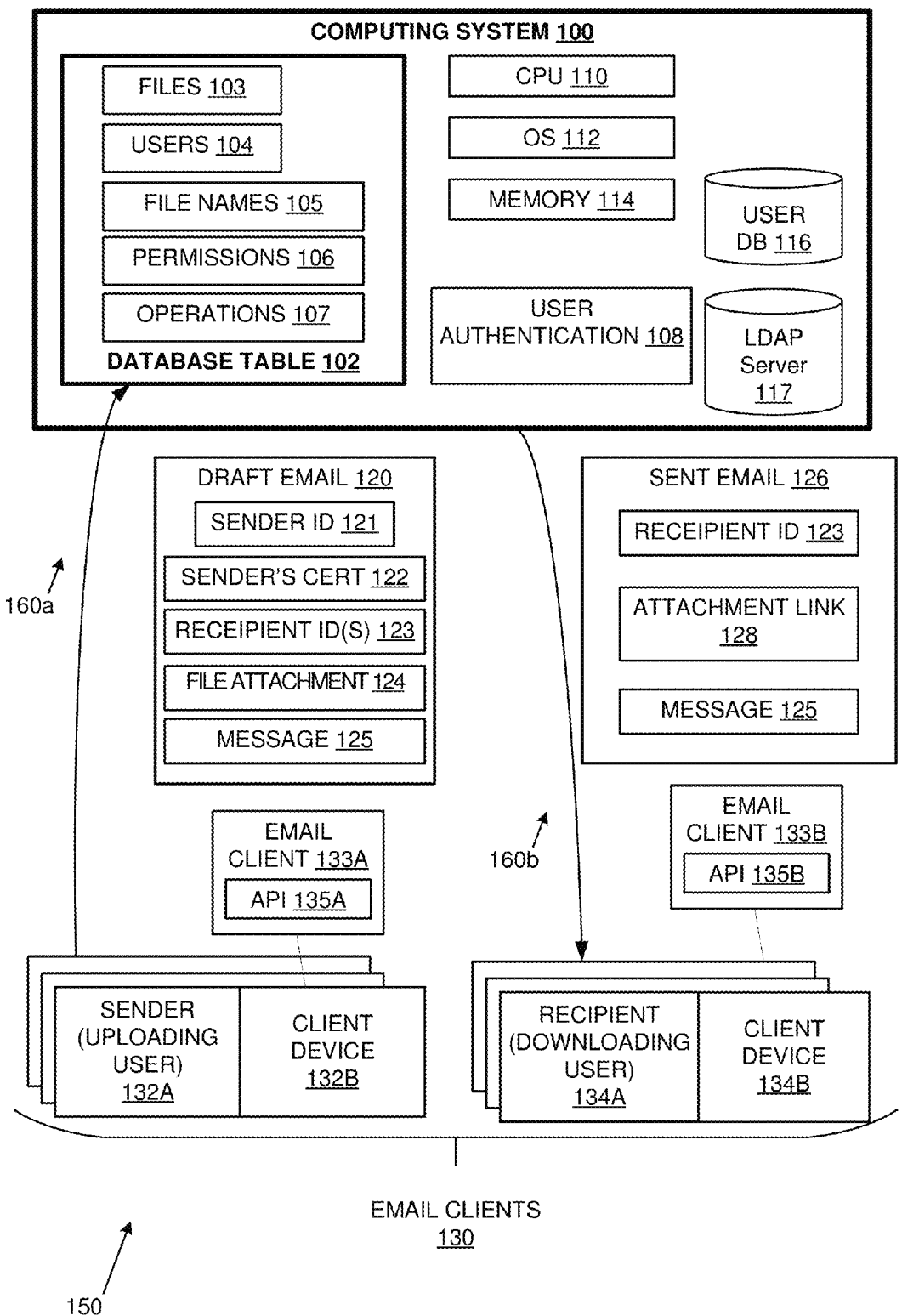
FIG. 1 is a diagram depicting an example environment for authorizing access to and/or sharing of email file attachments using a database table.

The following description is directed to techniques and solutions for authorizing access by email and sharing of file attachments. More specifically, a network environment may be provided where email clients may be coupled to a centralized web server. More specifically, each of a plurality of users may use a client device with one or more email clients coupled to the web server. The web server may provide one or more network functionalities, including email server functionalities, database functionalities, enterprise application functionalities, cloud storage functionalities, and so forth. In instances when a user sends a communication with a file attachment (e.g., an email with a file attachment) to other users (or has attached the file attachment and designated the recipients but has not sent the message), the web server may extract the email file attachment and store it at a database structure (e.g., a database table) maintained at the web server (or at attached or remote storage accessible by the web server). In some instances, the extraction of the email may be performed after the user attaches the file attachment to an email but prior to sending the email.

Upon receipt of the user's email (or upon detecting a file attachment being attached to an email), the web server may detect the sender and the intended recipients of the email. After web server authentication of the sender and the recipients takes place, a user identifier of the sender and a user identifier of the recipients (e.g., name or email address) may be stored in the database table, with corresponding permissions for controlling (e.g., allowing or denying) access to the file attachment received with the email and stored in the database table. The permissions may be changed (e.g., the sender may have administration rights and be able to change/edit/delete permissions for one or more of the intended recipients). For example, as a sender of the email (and presumably, having ownership/editing rights to the file attachment), the sending user may be assigned ownership (or managing) rights to the file attachment. Additionally, downloading rights may be assigned to those users designated as email recipients. The email file attachment in the email may be replaced with a link (or another indication) associated with a location of the file attachment within the database table. The email with the link may be forwarded to the intended recipients, who may activate the link and obtain access based on the corresponding permissions associated with the recipient requesting access to the file attachment.

Establishing (or setting up) of permissions (or access privileges) for accessing an email file attachment by one or more of the sender and recipients of an email may be performed automatically (e.g., upon receipt of the email with the file attachment or upon attaching the file attachment to the outgoing email and designating the recipients but prior to sending). The transfer of the file attachment to the database table and replacing it in the email with a link to the file location in the database table may also be performed automatically and without user intervention. In this regard, access privileges for accessing the file attachment may be established based on information in the received email and may be stored together with the file attachment at a single data structure (e.g., database table).

In any of the examples herein, a computing environment can be provided for authorizing access (e.g., by establishing user permissions) to one or more file attachments as well as uploading and sharing the file attachment among users using a database table. The computing environment can be a server environment operated by an organization. FIG. 1 is a diagram depicting an example environment 150 for authorizing access to and/or sharing of email file attachments using a database table. Referring to FIG. 1, the example environment 150 may comprise a computing system 100 and email clients 130. The email clients 130 may comprise email clients 133A for uploading users 132A and email clients 133B for downloading users 134A. More specifically, an uploading user 132A (or downloading user 134A) may use a client device 132B (or 134B), and the client device 132B (or 134B) may use the email client 133A (or 133B) for providing email functionalities to the user 132A (or 134A).

The computing system 100 may be a compute service provider (i.e., a cloud provider or another network type provider) and may be capable of delivery of network-related services (e.g., network computing, email management, and/or storage capacity) to a community of end recipients (e.g., email clients 130). In an example embodiment, the computing system 100 can be established for an organization by or on behalf of the organization. That is, the computing system 100 may offer a private network (e.g., cloud) environment where the plurality of clients 130 are part of the same organization. In another embodiment, the computing system 100 support a multi-tenant environment, wherein a plurality of customers operate independently (i.e., a public network environment).

The particular illustrated computing system 100 includes a database table 102, a central processing unit (CPU) 110, operating system (OS) 112, memory 114, a user authentication module 108, an LDAP server 117, and a user database 116. The processing unit 110 can be a general-purpose central processing unit (CPU), processor in an application-specific integrated circuit (ASIC), or any other type of processor. The memory 114 may be a dedicated memory, which may include on-chip or off-chip memory, as well as attached and/or remote storage. The OS 112 may be stored in (and run from) the memory 114, executing one or more of the functionalities described herein.

The user authentication module 108 may comprise suitable circuitry, logic, and/or code and may be operable to authenticate users (e.g., users 132A or 134A of one or more of the email clients 130) for accessing and using any of the functionalities provided by the computing system 100 (e.g., the functionalities associated with the database table 102). For example, the user authentication module 108 may authenticate a sender of an email for purposes of allowing communications with the computing system 100 and any of the email clients 130 (e.g., sender or an uploading user 132A is authenticated for sending an email message to one or more of the email clients 130, including sending one or more file attachments to the clients 130). A recipient of an email may respond to a sender's email or request other services by the computing system 100 (e.g., file attachment access/download) and, therefore, may also be authenticated for communication with the computing system 100, including access to any files (e.g., file attachments) maintained by the computing system 100. The user database 116 may provide a list of authorized users (e.g., employee email list for the users 130), including names and/or digital certificates for any user, which information may be used by the user authentication module 108 for authentication.

In an example embodiment, the user authentication module 108 and/or the user database 116 may be implemented using a web application (e.g., running as a separate server within the computing system 100), which may be responsible for authentication and authorization of the users (e.g., users 130) against a directory service server 117. In some examples, a central Lightweight Directory Access Protocol (LDAP) server is shown, but other directory service implementations can be used in practice. One or more of the user authentication requests (e.g., authentication requests in connection with allowing access to functionalities of the database table 102) may be made via a secure channel (e.g., communication paths 160*a*, 160*b*) using, for example, Hypertext Transfer Protocol Secure (HTTPS) transport and client certificate authentication for the user. In some instances, the LDAP server 117 and the user database 116 may be implemented together with (e.g., as part of) the user authentication module 108.

The database table 102 may be a data structure comprising one or more sub-structures (or sub-tables), such as a files table 103, a users table 104, a file names table 105, a permissions table 106, and an operations table 107. In practice, fewer, additional, or other tables can be used. For example, the operations table 107 or others can be omitted. The files table 103 may comprise suitable circuitry, logic, and/or code and may be implemented as a data structure (e.g., a sub-table within the database table 102) that is operable to store one or more files (e.g., file attachments). The files table 103 may use, for example, the memory 114 and/or dedicated cloud and/or on-premises storage accessible by the computing system 100. The users table 104 may comprise suitable circuitry, logic, and/or code and may be implemented as a data structure (e.g., a sub-table within the database table 102) that is operable to store information identifying one or more of the users 130. The identifying information may include user's email address, name, digital certificate, and so forth, which information may be extracted using, e.g., an email received by the computing system 100 from an email client 133A of an uploading user 132A.

The file names table 105 may comprise suitable circuitry, logic, and/or code and may be implemented as a data structure (e.g., a sub-table within the database table 102) that is operable to store the names of the files (i.e., file attachments) stored in the files table 103. The permissions table 106 may comprise suitable circuitry, logic, and/or code and may be implemented as a data structure (e.g., a sub-table within the database table 102) that is operable to store one or more permissions associated with one or more of the users listed in the users table 104. For example, any permission in the permissions table may be associated with a given user (e.g., from the users table 104) and may be granted for a given file (e.g., a file listed in the file names table 105). Additionally, any permission associated with a user and a file may be one of a plurality of different types of permissions granting, for example, different access privileges to the user (e.g., ownership privileges, manager privileges, downloading privileges, etc.)

The operations table 107 may comprise suitable circuitry, logic, and/or code and may be implemented as a data structure (e.g., a sub-table within the database table 102) that is operable to store one or more operations that have been performed with regard to at least one of the files listed in the file names table 105. For example, the operations table 107 may store a list of operations (e.g., uploading a file by an uploading user 132, downloading a file by a downloading user 134, deleting a file from the files table 103, and so forth). Additional details with regard to the sub-tables 103-107 within the database table 102 are illustrated in reference to FIG. 3.

In practice, the systems shown herein, such as environment 150, can vary in complexity, with different functionality, components of differing complexity, and the like. For example, in practice, a computing system 100 can comprise a variety of other functionalities not shown to address, e.g., email functionality.

Although various components of the systems herein are shown as a single component, in practice, the boundaries between components can be changed. For example, in practice, the computing system 150 can be implemented across one or more machines, virtual or physical. Functionality can be distributed among such machines as desired. Additional features relating to security and redundancy can also be included.

The environment 100, any of the other systems described herein, and subsets of such systems can be implemented in conjunction with any of the hardware components described herein, such as the computing systems described below (e.g., processing units, memory, and the like). In any of the examples herein, the inputs, outputs, tables, file attachments, links, databases, and the like can be stored in one or more computer-readable storage media or computer-readable storage devices. The technologies described herein can be generic to the specifics of operating systems or hardware and can be applied in any variety of environments to take advantage of the described features.

As shown in FIG. 1, a draft email 120 being sent by a sender (uploading user) 132A can include a sender identifier 121 identifying the sender (e.g., the sender or author of the email 120), a sender certificate 122 associated with the sender, one or more recipient identifiers 123 identifying recipients for the email, one or more file attachments 124 considered attached to the email 120, and a message 125. Although the user 132A is sometimes called an "uploading" user, such uploading can be transparent to the user (e.g., the user simply sends the email, and the uploading is done without explicit knowledge of the user).

Figure 2:
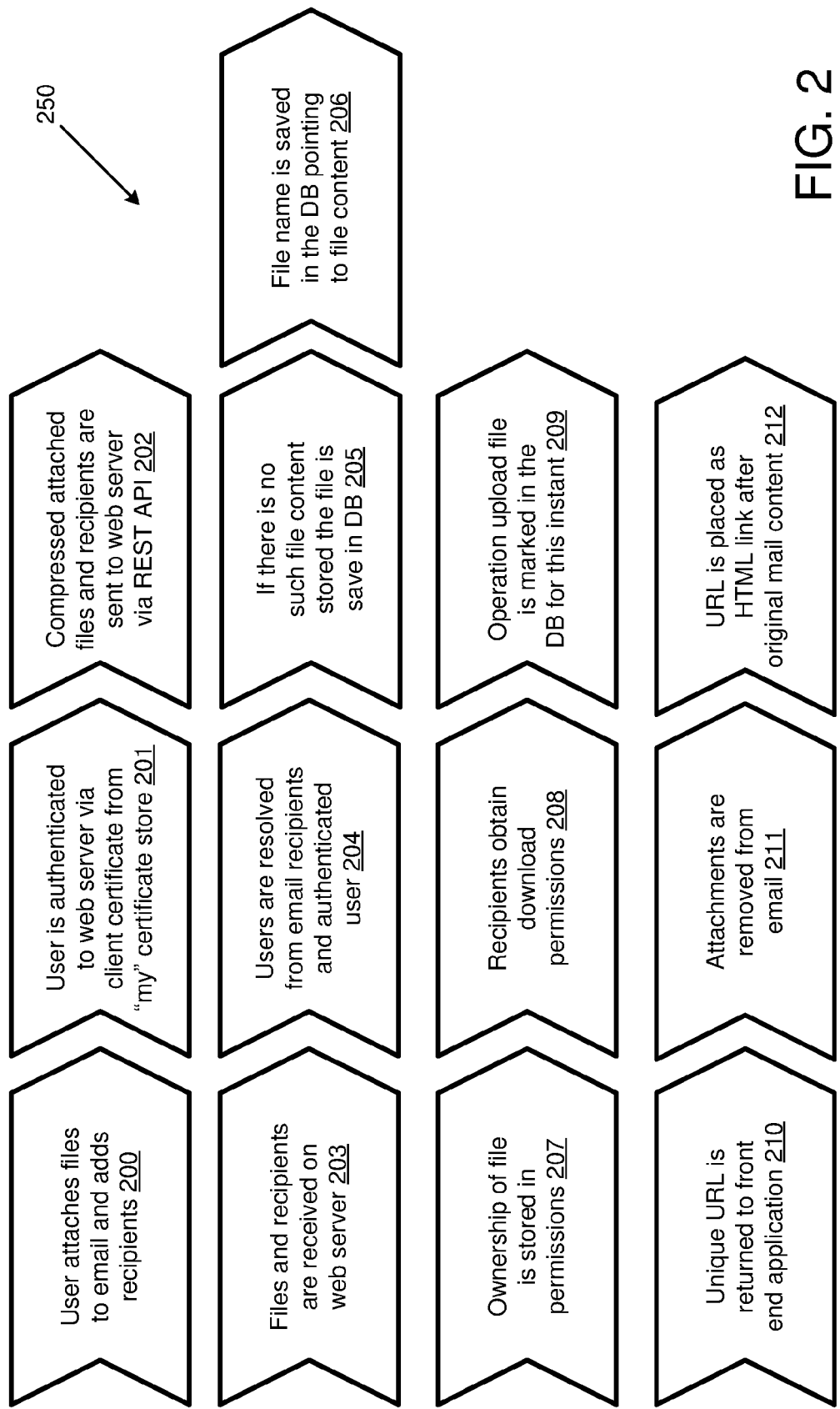
FIG. 2 is a block diagram of an example method for uploading file attachments and establishing authorizations for accessing the file attachments.

FIG. 2 is a block diagram of an example method for uploading file attachments and establishing authorizations for accessing the file attachments. Referring to FIGS. 1-2, the example method 250 may start at 200, when files are attached and recipient identifiers are added to an email 120. For example, an email client 133A executing at a client device 132B can attach one or more file attachments 124 to an email 120A. As described herein, such operations can be performed under control of the sender who interacts with user interfaces of an email client to achieve email authoring and sending.

The sender 132A may also designate one or more recipient identifiers 123 identifying the recipients 134A of the email 120 (such information may include user identifier information, e.g., email addresses for one or more of the recipients 134A using client devices 134B with corresponding email clients 133B). The email 120 may further include an email message 125. Optionally, the email message 120 may include a digital certificate, i.e., the certificate 122 associated with the sender identifier 121 of the sender (the certificate may be associated with a user identifier, such as the sender's email address), which may be attached automatically to the email 120 or the digital certificate 122 may be stored elsewhere (e.g., at 108, 116, and/or 117)

In some instances, the sender 132A may use the email client (e.g., 133A) to perform one or more of the functionalities associated with the method 250. For example, the front end client 133A may be implemented on the client device 132B as an add-in to an existing email client used within the system 100 (and by the email clients 130), which may, upon the sender's request, attach the file attachment 124 to the email 120 and/or to a central web server managed by the computing system 100 based on user authentication and access restriction criteria associated with the sender 121 (e.g., criteria may be specified/maintained by the user authentication module 108, the user database 116, and/or the LDAP server 117). Optionally, the email file attachment 124 may be uploaded to cloud storage for public and/or private access (e.g., password-protected access). A similar email client (e.g., 133B) may also be used on the download side of communication link 160b, which may be used by one or more of the recipients 123 (e.g., downloading users 134A using corresponding client devices 134B) for purposes of accessing and downloading one or more file attachments (e.g., as may be stored/maintained by the database table 102).

At the time of sending, the file attachment 124 may be a file located at a computing device associated with the sender 121 (e.g., a computing device) or it may be a file that is already available for public access (or restricted/private access via password or user authentication) within the computing system 100.

After the sender 132A attaches the file attachment 124 to email 120, the sender 132A may be authenticated to the computing system 100 by the user authentication module 108. For example, the user authentication module 108 may use the sender's digital certificate 122 (associated with the sender's email address 121) and/or the user database 116 to authenticate the sender 132A (e.g., by using the certificate associated with the uploading user's email or verifying the sender's name or email address 121 against the user database 116) for accessing the computing system 100 (optionally, the digital certificate 122 associated with a user identifier 121, such as email address of the sender, may be stored within the user database 116 and may be accessed based on the user credentials or user identifier, such as the sender's email address). At 202, the system 100 may use an application programming interface (e.g., API 135A, which is associated with the email (e.g., front end) client 133A) to send the uploaded file attachment 124 and a list of the recipient identifiers 123 to the computing system 100 (e.g., file attachment 124 may be in compressed or uncompressed form). In the example, a representational state transfer API is used to facilitate usage in conjunction with HTTP (or HTTPS), but other implementations can be supported.

At 203, the computing system 100 may receive the file attachment 124 and the list of recipient identifiers 123 from the API 135A. At 204, users may be resolved in the users table 104, using the authenticated sender 121 and the recipient identifiers 123. More specifically, the sender identifier 121 and the recipient identifiers 123 may be used to further identify the sender and recipient using, e.g., the user database 116, and user identifying information (e.g., user's email and/or name) may be stored in the users table 104. At 205, the file attachment 124 may be checked against files already stored in the files table 103 (e.g., a file hash may be computed for the file attachment 124 and compared with file hashes of already stored files to determine if the file has been previously stored in the files table 103). If the file attachment 124 was not previously stored, the system 100 may store the file attachment 124 in the files table 103. At 206, the name of the file attachment 124 may be stored in the file names table 105.

At 207, the ownership of the file attachment 124 is stored in the permissions table 106. For example, the permissions table 106 may be updated to indicate that a user identifier 121 associated with the sender has ownership/management privileges (e.g., full access to edit/delete the file attachment 124), and (at 208) the indicated recipients 123 have limited access (e.g., download only access) to the file attachment 124. At 209, the operations table may be updated to list an "upload" operation has been completed at a certain time, where the upload is associated with file attachment 124 and a user identifier 121 for the uploading user (sender) 132A.

At 210, the computing system 100 may return a unique Uniform Resource Locator (URL), e.g., attachment link 128, to the front end client 133. The file attachment 124 may be removed from the email 120 and replaced with the attachment link 128. For example, the attachment link 128 may be placed together with (e.g., after) the original email content (e.g., the message 125). In this regard, the draft email 120 may be transformed and the email 126 (sent email) may in fact be communicated to the intended recipients 123. The sent email 126 may be addressed to the recipients 123 and may include the attachment link 128 with the email message 125. Although the file attachment is still associated with the sent email 126, the actual content of the file attachment 124 need not be included in the sent email 126.

Figure 3:
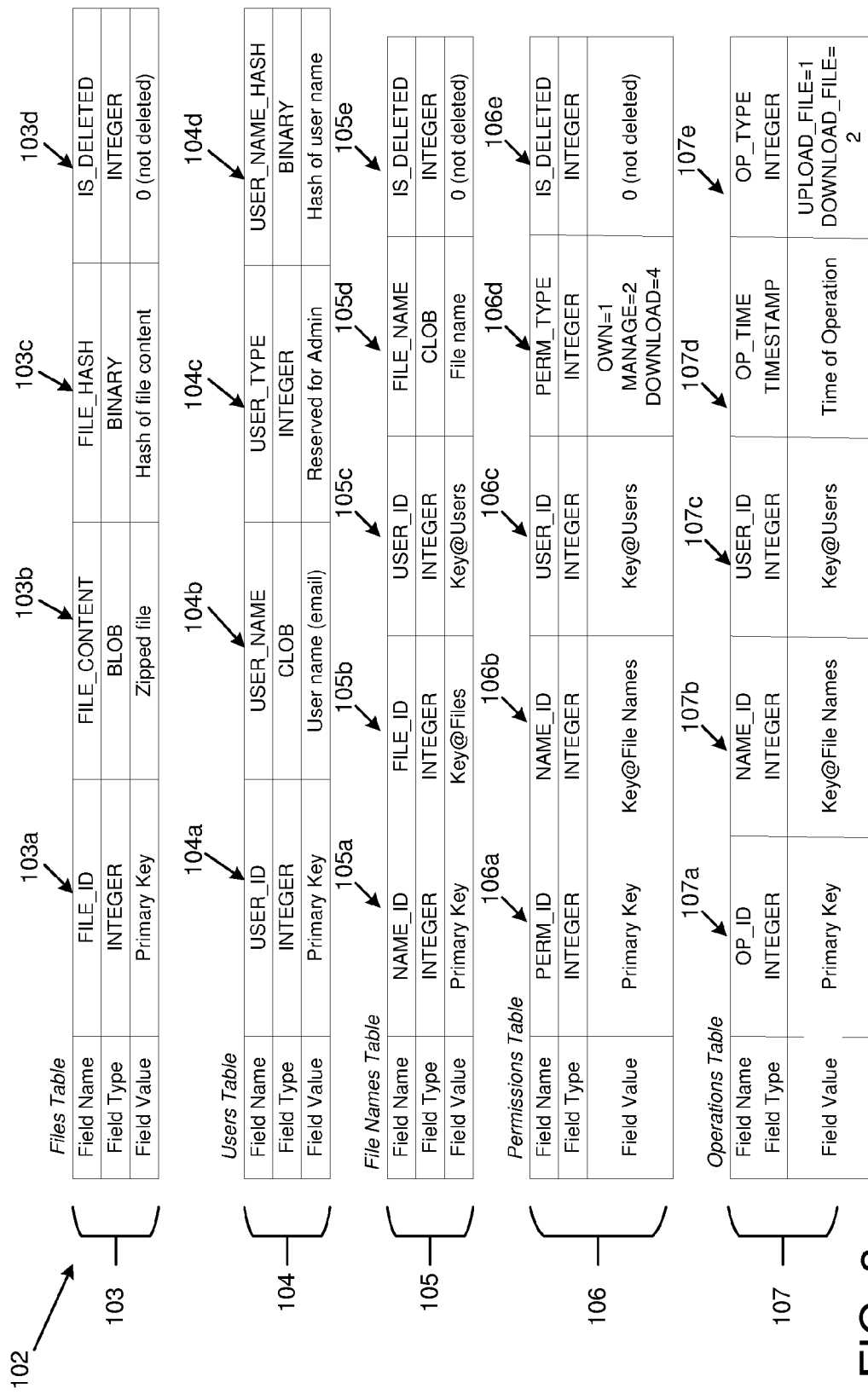
FIG. 3 is a block diagram of a database table, which may be used for authorizing access to and/or sharing of email file attachments, in connection with an embodiment of the disclosure.

FIG. 3 is a block diagram of a database table, which may be used for authorizing access to and/or sharing of email file attachments by senders and recipients, in connection with an embodiment of the disclosure. Referring to FIGS. 1-3, the example database table 102 may be a data structure comprising one or more sub-structures (or sub-tables), such as the files table 103, the users table 104, the file names table 105, the permissions table 106, and the operations table 107.

The files table 103 may comprise a file identification (FILE_ID) field 103a, a file content (FILE_CONTENT) field 103b, a file hash (FILE_HASH) field 103c, and a deletion flag (IS_DELETED) 103d. The FILE_ID field 103a may be of integer type and may be a primary key field value (e.g., used for identifying the stored file by other fields, e.g., 107b). The FILE_CONTENT field 103b may be of Binary Large Object (BLOB) field type, and may be a zipped file field value (i.e., this is the actual content of the uploaded file, which may be stored as a zipped/compressed file). The FILE_HASH field 103c may be of binary field type and the field value may the hash of the content (i.e., the FILE_HASH may be a hash value calculated for the uploaded file based on the file content and/or title). The IS_DELETED flag may be of integer field type and may indicate whether the file is considered deleted (e.g., flag value is 1) or not deleted (e.g., flag value is 0). In practice, the file may not actually be deleted, but is treated as deleted depending on the value of the flag.

The users table 104 may comprise a user identification (USER_ID) field 104a, a user name (USER_NAME) field 104b, a user type (USER_TYPE) field 104c, and a user name hash (USER_NAME_HASH) field 104d. The USER_ID field 104a may be of integer type and may be a primary key field value (e.g., used for identifying the user by other fields, e.g., 106c). The USER_NAME field 104b may be of Character Large Object (CLOB) field type, and may be the user identifier, such as the user's name or email address. The USER_TYPE field 104c may be of integer field type and the field value may indicate whether the user is an administrator (e.g., value is 0) or non-administrator (e.g., value is 1). The USER_NAME_HASH field 104d may be of binary field type and the field value may be the hash of the user's name. The USER_NAME_HASH field 104d may be used for searching users and/or determining whether certain user is stored within the database table 102.

The file names table 105 may comprise a file name identification (NAME_ID) field 105a, a file identification (FILE_ID) field 105b (which may refer to field 103a), a user identification (USER_ID) field 105c (which may refer to field 104a), a file name (FILE_NAME) field 105d, and a deletion flag (IS_DELETED) 105e. The NAME_ID field 105a may be of integer type and may be a primary key field value (e.g., used for identifying the file name by other fields, e.g., 106b). The FILE_ID field 105b may be of integer type and the field value may refer to the field 103a. The USER_ID field 105c may be of integer type and the field value may refer to the field 104a. The FILE_NAME field 105d may be of CLOB field type and the field value may include the name of the file identified by 105b. The flag 105e may be of integer field type and may indicate whether the file name is considered deleted (e.g., flag value is 1) or not deleted (e.g., flag value is 0). In practice, the file may not actually be deleted, but is treated as deleted depending on the value of the flag.

The permissions table 106 may comprise a permission identification (PERM_ID) field 106a, a file name identification field (NAME_ID) 106b for the permission, a user identification (USER_ID) field 106c for the permission, a permission type (PERM_TYPE) field 106d, and a deletion flag (IS_DELETED) 106e. The PERM_ID field 106a may be of integer type and may be a primary key field value. The NAME_ID field 106b may be of integer type and the field value may refer to the field 105a. The USER_ID field 106c may be of integer type and the field value may refer to the field 104a. The PERM_TYPE field 106d may be of integer field type and the field value may include an integer indicating the type of permissions (or file access privileges) associated with the permission (e.g., a value of 1 may indicate ownership privileges, or full access; a value of 2 may indicate management privileges, which may be the same as ownership privileges or limited in certain ways; and a value of 3 may indicate downloading privileges). The flag 106e may be of integer field type and may indicate whether the permission is considered deleted (e.g., flag value is 1) or not deleted (e.g., flag value is 0). In practice, the permission may not actually be deleted, but is treated as deleted depending on the value of the flag.

The operations table 107 may comprise an operation identification (OP_ID) field 107a, a file name identification field (NAME_ID) 107b for the permission, a user identification (USER_ID) field 107c for the operation, an operation time (OP_TIME) field 107d, and operation type (OP_TYPE) field 107e. The OP_ID field 107a may be of integer type and may be a primary key field value. The NAME_ID field 107b may be of integer type and the field value may refer to the field 105a. The USER_ID field 107c may be of integer type and the field value may refer to the field 104a. The OP_TIME field 107d may be of integer field type and the field value may include an integer indicating the time the operation took place. The OP_TYPE field 107e may be of integer field type and the field value may indicate the type of operation performed on the identified file (e.g., a value of 1 may indicate the file was uploaded and a value of 2 may indicate the file was downloaded).

In example embodiments of the disclosure, the computing system 100 may use the database table 102 to manage authorizations/permissions for file access based on user identifiers (e.g., the user email address may be used as attributes to establish authentication by the LDAP server 117, and then set up one or more permissions in the permissions table 106 based on the who the sender and the intended recipients of the email are). Additionally, the database table 102 may be used for storing (and managing access to) file attachments, which may be stored in the files table 103 as compressed, e.g., zipped, files (text documents, source code, and XML type documents have a high compression ratio and, therefore, significant storage savings may be realized). Furthermore, using a file hash (File_Hash 103c), the files table 103 may store the same content/file only once, even though the same file may be communicated in emails under different names. In this regard, database space may be saved upon sharing the same file, which may be stored once within the files table 103 (even though the same file may be communicated in emails under different names) and accessed from multiple authorized users.

Figure 4:
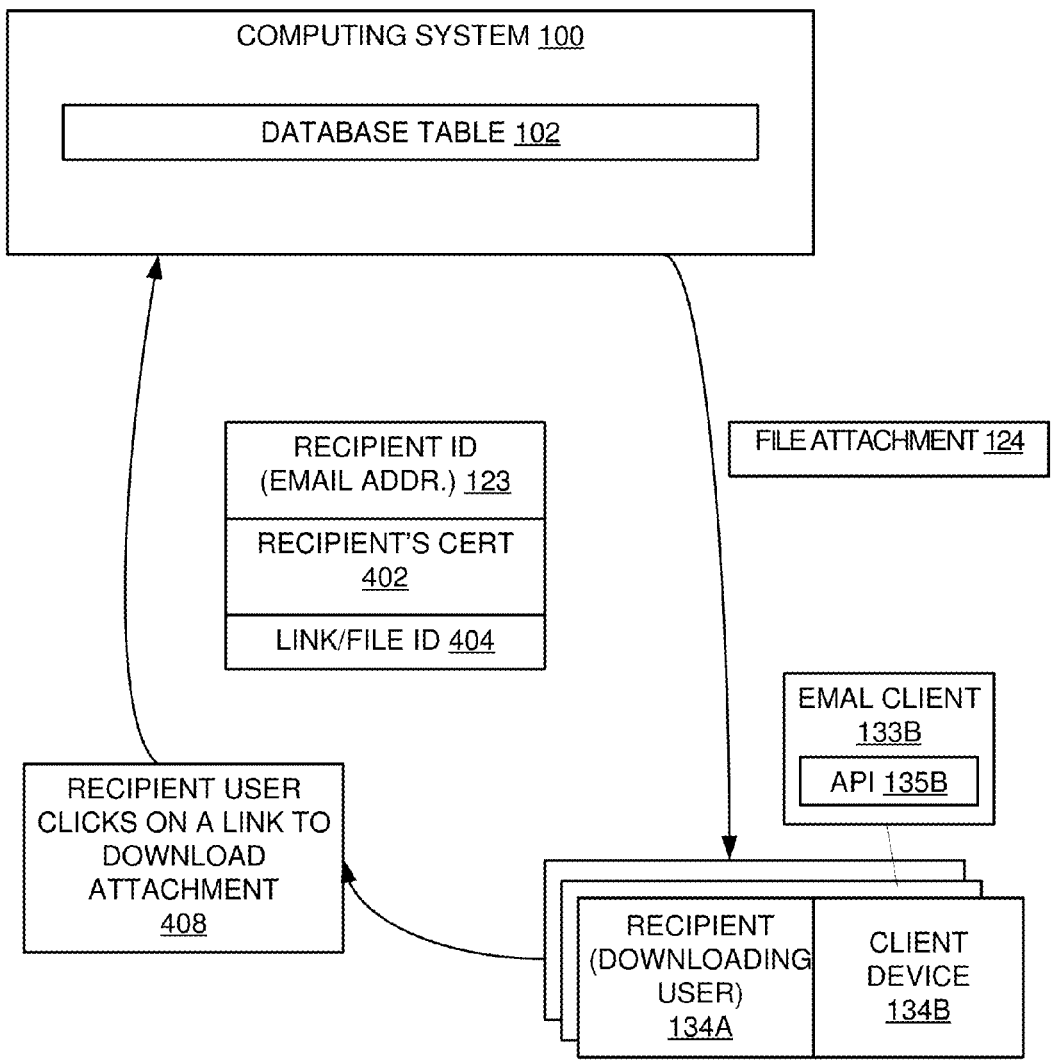
FIG. 4 is a diagram depicting an example environment for authorizing access to and/or accessing file attachments using a database table.
Figure 5:
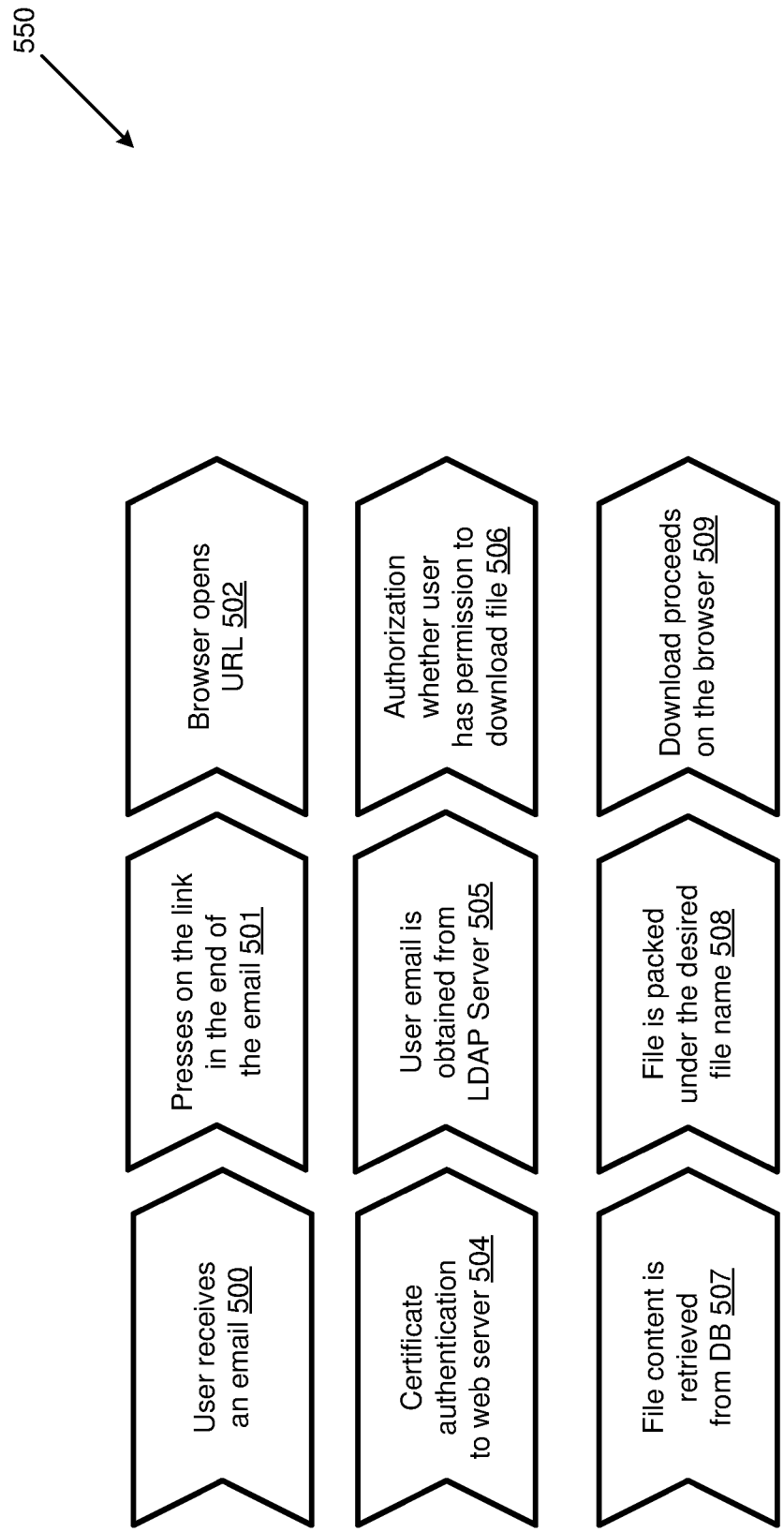
FIG. 5 is a block diagram of an example method for downloading file attachments using a database table.

FIG. 4 is a diagram depicting an example environment for authorizing access to and/or accessing file attachments using a database table. FIG. 5 is a block diagram of an example method for downloading file attachments using a database table. Referring to FIGS. 1, 4, and 5, the example method 550 may start at 500, when an email (e.g., 126) or indication thereof is received. For example, the recipient 134A (of the recipients 134A) receives an email (e.g., 126) using the email client 133B (e.g., an email API 135B associated with the email client 133B) installed at a client device 134B. At 501, the recipient 134A may press (activate by clicking, tapping, or the like) the link 128 (e.g., using the API 135B) in order to download the file attachment 124 (this is also indicated as 408 in FIG. 4). From the email client 133B perspective, an indication of activation of the link 128 is received.

At 502, a browser (e.g., at a computing device used by the recipient 123) may be open, and the browser may open the URL link 128. In practice, content can be rendered without explicitly presenting a browser. At 504, the computing system 100 may obtain (or receive) identification (e.g., email address, digital certificate, and/or name) of the recipient 123 activating the link 128. The computing system 100 may also obtain (or receive) information 404 identifying the activated link 128 and/or the file attachment 124 associated with the link 128. Optionally, a digital certificate 402 may also be communicated to the computing system 100 (or the computing system 100 may obtain such certificate from the user authentication module 108, the user database 116, and/or from the LDAP server 117). At 505, the recipient identifier 123 (e.g., user identification information such as user's email address) may be received at the computing system 100 or obtained from, e.g., the LDAP server 117. At 506, the user authentication module 108 may authenticate the recipient 134A using the recipient's user identification information 123 (e.g., recipient's email address) and/or the recipient's digital certificate 402. For example, the authentication may verify that the recipient 134A is allowed to download (or otherwise have access to) the file attachment 124.

At 507, the file content and file name for file attachment 124 are retrieved from the database table 102 (e.g., from the files table 103 and the file names table 105). At 508, the retrieved file attachment 124 is packed under the retrieved file name and, at 509, the download may conclude with the file attachment 124 being communicated (downloaded) at the client device 134B of the recipient 123 (i.e., the downloading user 134A).

In any of the examples herein, sending users (e.g., senders such as uploading users 132A) and receiving users (e.g., recipients such as downloading users 134A) may have user identifiers (or user identifying information) associated with them. Such user identifiers may be used to identify a user and may include a user's name, username, email address, a digital certificate, token, or any combination thereof. Email clients 133A may be installed at client devices 132B of uploading users 132A, and email clients 133B may be installed at client devices 134B of downloading users 134A. Email clients 133A and 133B are associated with a user identifier (e.g., that identifies a user of the corresponding client device with the installed email client who logs in with a username and a password, or another authentication scheme, in order to use the email client installed on such client device). In practice, the user identifier used for the client device, email client, and the computing system implementing the attachment technology may differ. For example, a different identifier (e.g., an integer or the like) may be used in the users table 104 instead of an email address. A mapping between the different identifiers may be used to preserve user identity within the systems.

In any of the examples herein, the term "attachment" or "file attachment" may refer to a file or other data attached to an e-mail. The file may be an executable file, an unformatted text file, a binary file (or formatted text file), and so forth. In some instances the file may be encoded or compressed at time of attachment and prior to sending the email, and then decoded or decompressed when it is received.

As described herein, the attachment need not actually be included in the email when then email is received or otherwise provided to a recipient. A link to the attachment can be provided instead.

In any of the examples herein, the term "attachment link" or "download link" may refers to a hyperlink (e.g., a Direct Download Link, or DDL), which points to a location within the Internet (or a private network accessible within the computing system 100) where a user can download a file (e.g., a file attachment such as 124). In this regard, an attachment (or download) link (e.g., 128) may identify the file attachment (124) it is associated with, as well as a location within the files table 103 the file attachment is stored in. More specifically, the attachment link 128 may be associated with a specific network IP address (or file transfer protocol or FTP address) hosting a network storage that stores all attachments for the files table 103.

The actual name or file location of the attachment need not be included in the link. Instead, a mapping scheme can be used whereby a reference (e.g., unique reference number) maps to a file location or entry in one of the databases described herein.

In accordance with an example embodiment of the disclosure, an administrator within the computing system 100 may create/initialize the database table 102. In this instance, the table 102 will have empty fields, except the administrator may be listed in the users table 104 (the USER_TYPE field 104c may be 1, indicating that the user has administrator privileges). The administrator may have access to edit/delete files from the files table 103, file names from the file names table 105, as well as to modify user permissions (i.e., change field 106d) for a given user, or delete a given user altogether (change field 106e to 1 indicating a user is unauthorized for access or deleted).

Some administration privileges may also be provided to any of the email users 132A, 134A logged in (or otherwise authorized for communication with) the computing system 100. For example, a user 132A, 134A may employ the email client 133A to communicate with the computing system 100 and obtain information on file attachments stored in the database table 102 associated with the specific user 132A, 134A. In this regard, the email client 133A may provide an administration interface for the file attachments stored in the database table 102 which the client 133A can download for the user, or file attachments which the user has ownership or managing rights over. For example, separate tables may be used by the administration interface for files the user 132A, 134A has privileges for (and access to) download, files that can be managed and files that the user has uploaded (i.e., the user owns). In the first table there may be listed files that can only be downloaded. In the second and third table, the listed files may be managed by the user (e.g., delete, change access and so forth), or the user may be able to obtain information/metadata about the file (e.g., who has downloaded the file, how big is the file, date of creation, and so forth).

Figure 6:
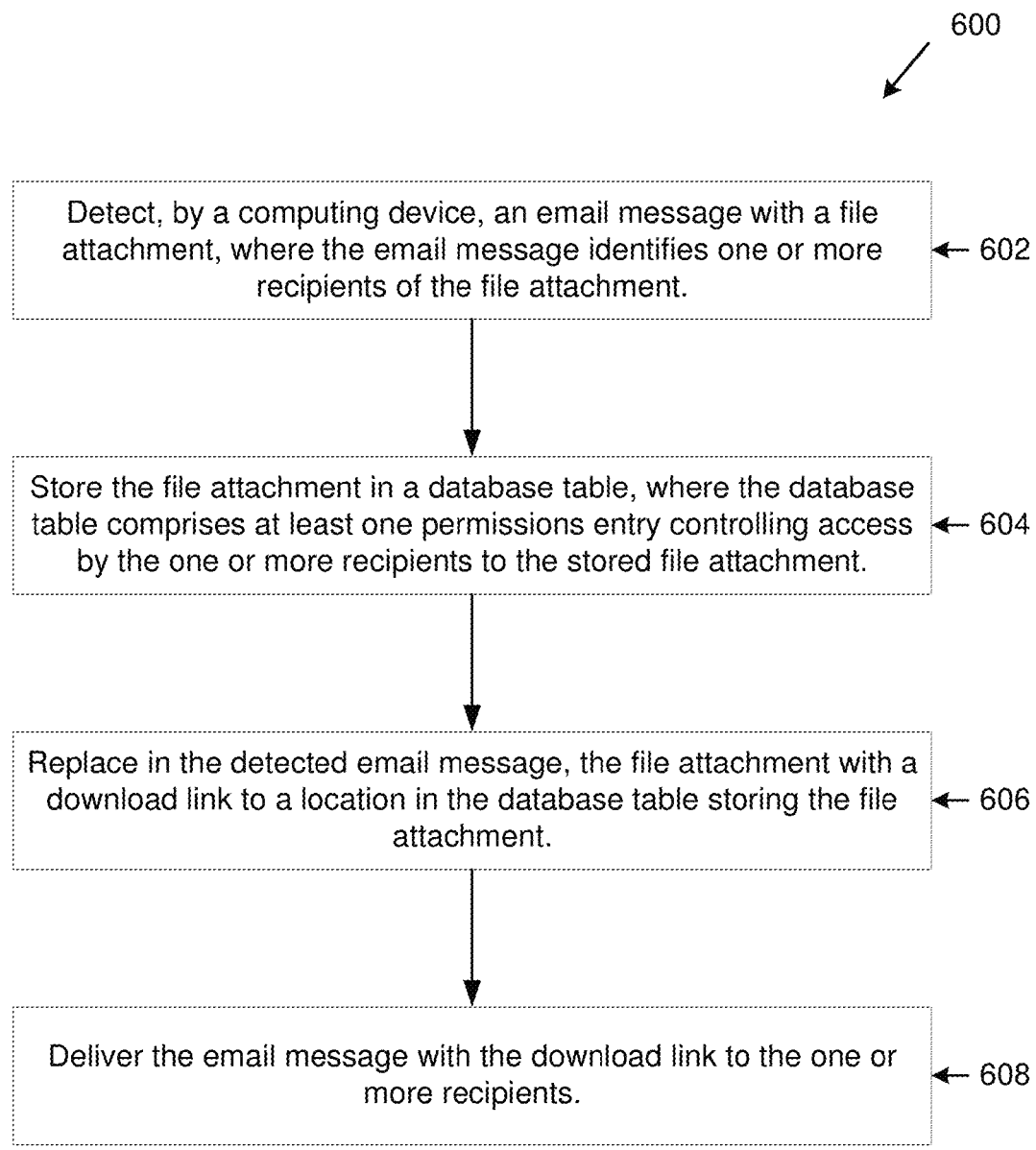
FIGS. 6-8 are flow diagrams for example methods of authorizing access to and/or sharing of email file attachments, in accordance with an example embodiment of the disclosure.
Figure 7:
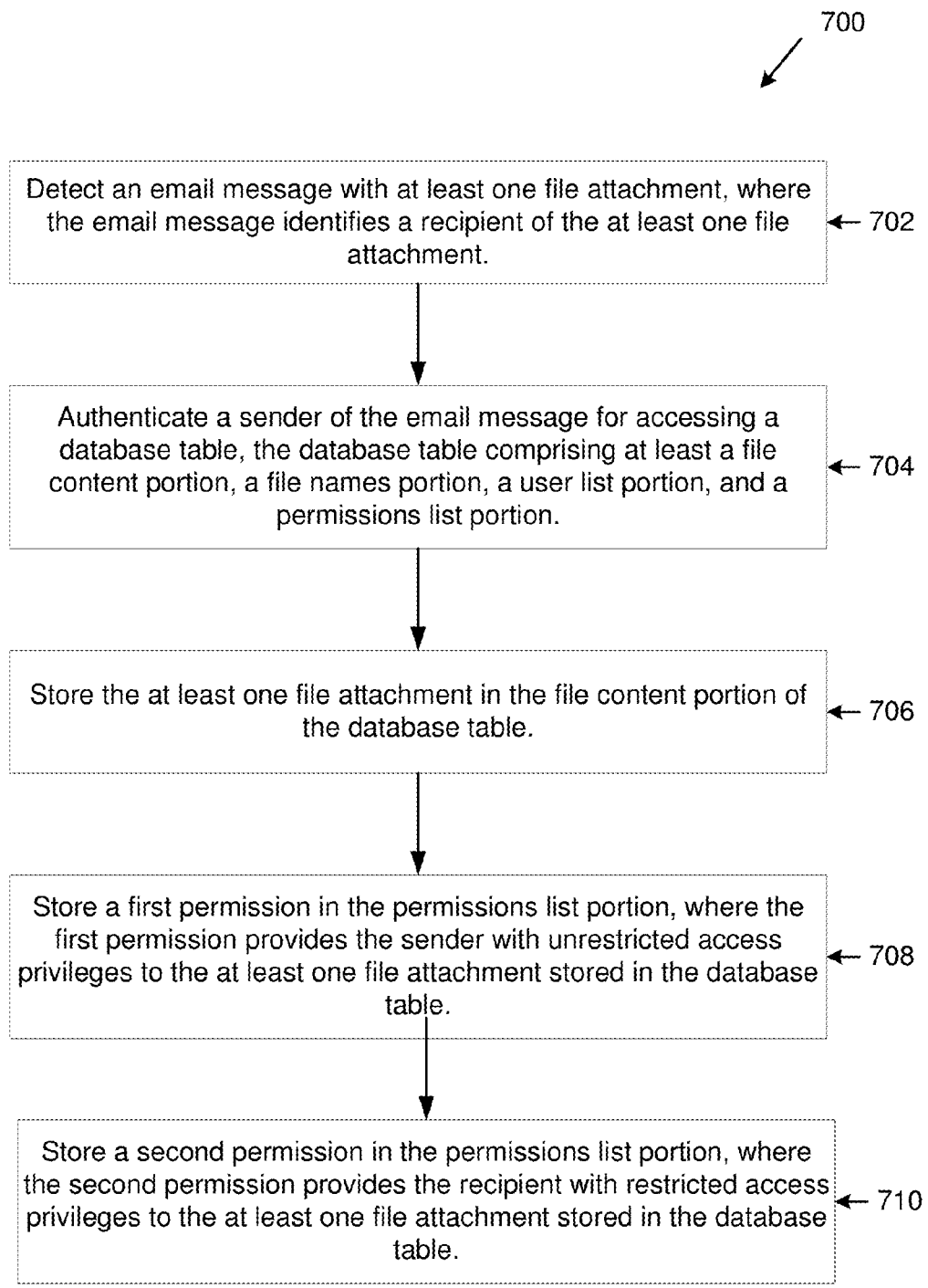
Figure 8:
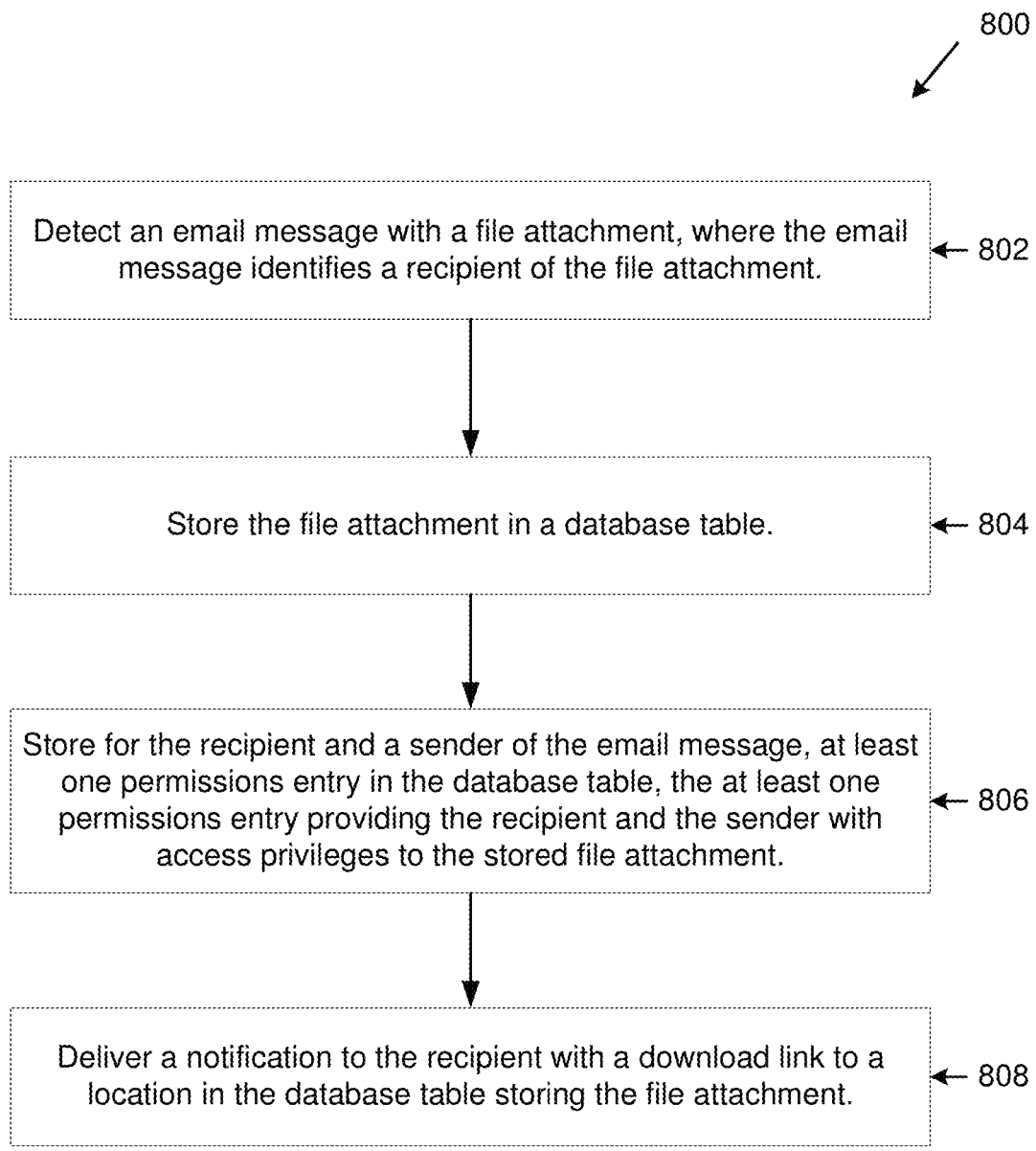

In any of the examples herein, methods can be provided for authorizing access to file attachments using emails as well as sharing of file attachments using a database table. FIGS. 6-8 are flow diagrams for example methods of authorizing access to and/or sharing of email file attachments, in accordance with an example embodiment of the disclosure. Referring to FIGS. 1-6, the example method 600 may start at 602, when a computing device (e.g., device or an email client used by the sender 121 and/or the computing system 100) may detect an email message (e.g., email 120) with a file attachment (e.g., file attachment 124). The email message 120 may identify one or more recipients (e.g., via recipient identifier(s) 123) of the file attachment. At 604, the file attachment (124) may be stored in a database table (e.g., within the files table 103 as part of the database table 102). The database table 102 may include at least one permissions entry (e.g., entries in the permissions table 106) controlling (e.g., allowing or denying) access by the one or more recipients (e.g., identified by the identifier(s) 123) to the stored file attachment 124. At 606, the file attachment 124 may be replaced in the email message 120, with a download link (e.g., 128) to a location in the database table (e.g., table 103 within table 102) storing the file attachment. At 608, the email message (e.g., 126) may be delivered with the download link 128 to the one or more recipients 134A (e.g., identified by the identifier(s) 123).

The sender 132A of the email may be authenticated (e.g., by module 108) based on a sender identifier 121 (e.g., one or more of a name of the sender, an email address of the sender, and a digital certificate 122) of the sender 132A (or any other user identifier). Upon authenticating the sender 132A, an identifier of the sender and an identifier of the one or more recipients 134A may be stored in a user name portion of the database table (e.g., users table 104 within table 102). The at least one permissions entry (in table 106) may provide a file owner access privilege, a file manager access privilege, or a file downloader access privilege for accessing the file attachments stored in the files table 103.

A first permissions entry may be stored in the database table (e.g., table 106), where the first permissions entry may provide the sender 132A with the file owner access privilege (field 106d has a value of 1). At least a second permissions entry may be stored in the database table (e.g., table 106), where the at least a second permissions entry provides the one or more recipients 134A with the file downloader access privilege (e.g., field 106d has a value of 4). In response to delivering the email message (e.g., 126), an indication that the download link (128) has been selected by the one or more recipients may be received from the one or more recipients (e.g., via the email client 133B), as illustrated in reference to FIGS. 4-5. The indication may include a file name of the at least one file attachment associated with the download link (e.g., 404) and at least one of: an email for the one or more recipients, a name of the one or more recipients, and a digital certificate (402) of the one or more recipients 134A. The one or more recipients may be authenticated (e.g., by module 108) based on the email address, the name, the digital certificate, or any other user identifier associated with the one or more recipients.

Referring to FIGS. 1-5 and 7, the example method 700 may start at 702, when an email message 120 with at least one file attachment 124 may be detected (e.g., by the computing system 100 and/or the front end client 133). The email message 120 may identify a recipient 123 of the at least one file attachment 124. At 704, the sender 132A of the email message may be authenticated (e.g., by module 108) for accessing a database table (e.g., 102). The database table 102 may include at least a file content portion 103, a file names portion 105, a user list portion 104, and a permissions list portion 106. At 706, the at least one file attachment 124 may be stored in the file content portion 103) of the database table 102. At 708, a first permission may be stored in the permissions list portion 106. The first permission may provide the sender 132A with unrestricted access privileges to the at least one file attachment stored in the database table (e.g., value 106d is 1 indicating unrestricted ownership privileges). At 710, a second permission may be stored in the permissions list portion 106, where the second permission may provide the recipient 134A with restricted access privileges to the at least one file attachment stored in the database table (e.g., value 106d may be 4 indicating restricted download privileges, such as download-only privileges). In this way, the sender may be treated as an owner of the attachment and be granted unrestricted ownership privileges, including the ability to change permissions or privileges for the attachment, even after it is sent. For example, the sender 132A may use the email client 133A on the client device 132B to access (e.g., using a user identifier such as the sender's email address or a user ide/password combination) the database table 102 and modify one or more of the fields (e.g., 103d, 105e, or 106e) associated with file attachments the user has ownership rights to or modify permissions of recipients designated by the sender at the time the file attachment was saved in the database table 102.

In an example embodiment of the disclosure, the email client 133A may include a central management application, allowing the sender 132A to access a management interface for each of the file attachment the sender has ownership rights to. For example, the sender 132A may use the client 133A to access a static URL link (e.g., https://acme.com/management) to a page where the file attachments that the sender owns are listed together with links to their respective management interfaces. By selecting an individual link for a specific file attachment, the sender 132A may access, for example, a management profile page where the sender 132A may change/delete permissions, view file attachment statistics such as file audit logs (information in the audit log may include which attachment was viewed, by which user, how many times it was viewed, the time of viewing, how many times attachment was downloaded, and so forth). The static URL page as well as the management interfaces for each file attachment stored in the database table 102 may be hosted by the computing system 100 or one or more of the client devices 132B/134B.

Referring to FIGS. 1-5 and 8, the example method 800 may start at 802, when an email message 120 with a file attachment 124 may be detected. The email message 120 may identify a recipient 134 of the file attachment via recipient identifiers. At 804, the file attachment 123 may be stored in a database table 102. At 806, for the recipient 134A and the sender 132A of the email message, at least one permissions entry may be stored in the database table (e.g., in table 106 within table 102). The at least one permissions entry may provide the recipient 134A and the sender 132A with restricted (e.g., value of 106d is 4) or unrestricted access privileges (e.g., value of 106d is 1 or 2) to the stored file attachment 124). At 808, a notification (e.g., email 126) may be delivered to the recipient 134A with a download link 128 to a location in the database table storing the file attachment (e.g., link 128 indicates the location in table 103 storing the file attachment 124).

Figure 9:
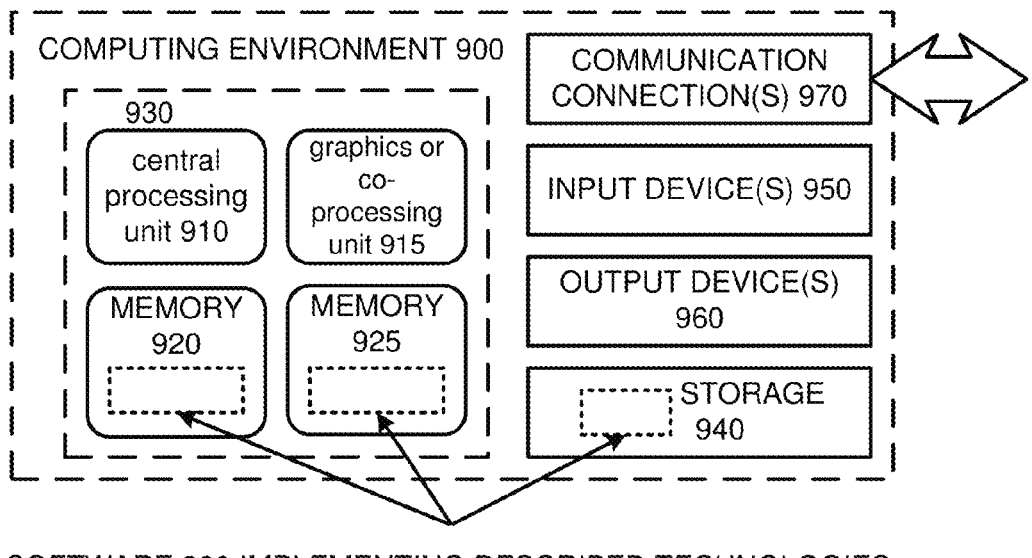
FIG. 9 is a diagram of an example computing system, in which some described embodiments can be implemented.

FIG. 9 is a diagram of an example computing system, in which some described embodiments can be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 10:
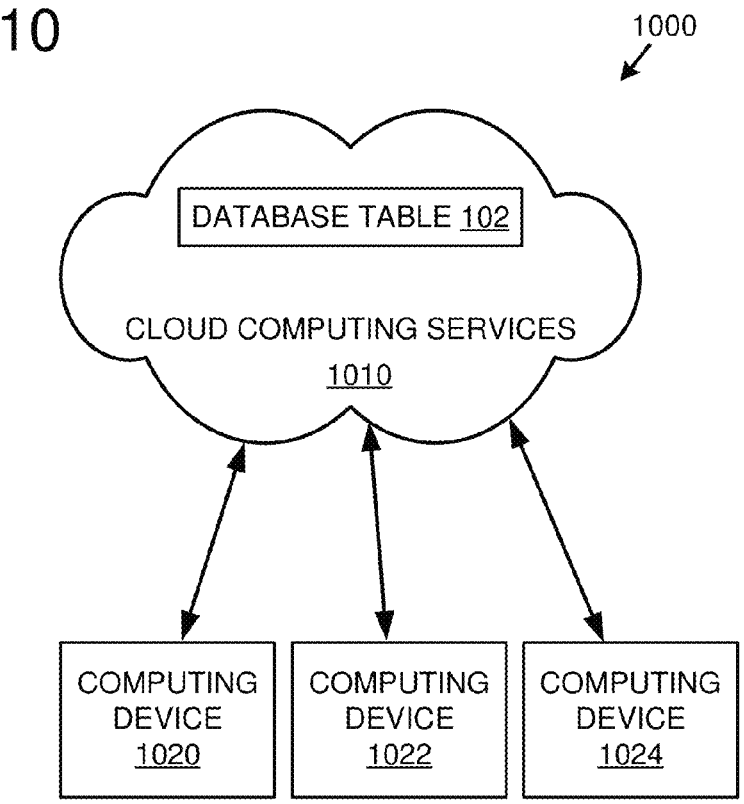
FIG. 10 is an example cloud computing environment that can be used in conjunction with the technologies described herein.

FIG. 10 is an example cloud computing environment 1000 that can be used in conjunction with the technologies described herein. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries). Additionally, the cloud computing service 1010 may implement the database table 102 and other functionalities described herein relating to the database table 102.

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, and the like).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., non-transitory computer-readable media, such as one or more optical media discs such as DVD or CD, volatile memory components (such as DRAM or SRAM), or non-volatile memory components (such as flash memory or hard drives)). By way of example and with reference to FIG. 9, computer-readable storage media include memory 920 and 925, and storage 940. The term computer-readable storage media does not include communication connections (e.g., 970) such as modulated data signals or carrier waves.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Pert, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations. As utilized herein, the term "processor" may be used to refer to one or more of a central processing unit, a processor of a symmetric or asymmetric multiprocessor system, a digital signal processor, a micro-controller, a graphics/video processor, or another type of processor.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of the claims.

I claim:

1. One or more non-transitory computer-readable storage media storing computer-executable instructions for causing a computer having such instructions in memory and executed on one or more processors to perform a method for replacing in an email an email file attachment with a download link, the method comprising:

detecting an email message with a file attachment from a sender, wherein the email message identifies a recipient;

automatically storing the file attachment in a database table at a location;

storing for the recipient and the sender of the email message, at least one permissions entry in the database table, the at least one permissions entry providing the recipient and the sender with access privileges to the stored file attachment, the at least one permission entry providing the recipient with read-only access privilege or download-only access privilege;

automatically replacing the file attachment in the email message with a download link in the email message, the download link providing access to the location in the database table storing the file attachment;

causing the email message containing the download link to be delivered to the recipient;

providing an administration interface to the sender, the administration interface listing one or more file attachments associated with the sender and the sender's permissions regarding the one or more file attachments;

upon accessing the file attachment by the recipient based on the read-only access privilege or the download-only access privilege, storing in the database table stored operations comprising a type of operation performed by the recipient and a time the operation was performed, wherein the type of operation comprises a read-only operation or a download-only operation;

receiving a request by the sender to view the stored operations; and causing the stored operations to be displayed to the sender.

2. The one or more non-transitory computer-readable storage media according to claim 1, wherein the method further comprises:

after causing the email message containing the download link to be delivered to the recipient, changing at least one permissions entry controlling access by the recipient to the stored file attachment.

3. The one or more non-transitory computer-readable storage media according to claim 1, wherein the method further comprises:

after causing the email message containing the download link to be delivered to the recipient, receiving input from the sender changing at least one permissions entry controlling access by the recipient to the stored file attachment.

4. The one or more non-transitory computer-readable storage media according to claim 1, wherein the download link contained in the email comprises a URL, a hyperlink, or a direct download link.

5. The one or more computer-readable storage media according to claim 1, wherein the method further comprises:

providing an administration interface to the recipient, the administration interface listing one or more file attachments associated with the recipient and the recipient's permissions regarding the one or more file attachments.

6. The one or more non-transitory computer-readable storage media according to claim 1, wherein the method further comprises:

prior to automatically storing the at least one file attachment, determining that the file attachment has not been previously stored in the database table at a location.

* * * * *